United States Patent [19]
Eidsmore

[11] Patent Number: 6,047,728
[45] Date of Patent: Apr. 11, 2000

[54] SPRING LOADED BELLOWS REGULATOR

[75] Inventor: Paul G. Eidsmore, Santa Cruz, Calif.

[73] Assignee: Swagelok Company, Cleveland, Ohio

[21] Appl. No.: 08/981,895

[22] PCT Filed: Jul. 3, 1996

[86] PCT No.: PCT/US96/11101

§ 371 Date: Apr. 27, 1998

§ 102(e) Date: Apr. 27, 1998

[87] PCT Pub. No.: WO97/02447

PCT Pub. Date: Jan. 23, 1997

[51] Int. Cl.[7] .................................................. G05D 16/02
[52] U.S. Cl. ...................................... 137/505.42; 137/510
[58] Field of Search ............................ 137/510, 505.42, 137/505.43

[56] References Cited

U.S. PATENT DOCUMENTS

| | | |
|---|---|---|
| 2,318,721 | 5/1943 | Siver . |
| 2,770,251 | 11/1956 | Goddard . |
| 3,812,877 | 5/1974 | Fleischhacker et al. . |
| 3,941,508 | 3/1976 | Worden . |
| 4,308,888 | 1/1982 | Gordon . |
| 4,327,767 | 5/1982 | Fehrenbach et al. ............... 137/510 |
| 4,424,738 | 1/1984 | Leighton ............................ 137/510 |
| 4,431,020 | 2/1984 | Kowalski . |
| 4,693,267 | 9/1987 | Patterson . |
| 4,744,387 | 5/1988 | Otteman ......................... 137/505.42 |
| 4,760,862 | 8/1988 | Mutou et al. . |
| 5,065,788 | 11/1991 | McManigal et al. ............ 137/505.42 |
| 5,234,026 | 8/1993 | Patterson . |
| 5,303,734 | 4/1994 | Eidsmore ........................ 137/505.43 |
| 5,407,329 | 4/1995 | Bueser et al. . |

FOREIGN PATENT DOCUMENTS

| | | |
|---|---|---|
| 0275931A2 | 7/1988 | European Pat. Off. . |
| 916921 | 8/1954 | Germany . |

*Primary Examiner*—Stephen M. Hepperle
*Attorney, Agent, or Firm*—Calfee, Halter & Griswold LLP

[57] ABSTRACT

A pressure regulating valve includes a valve (22') biased closed against seat (21') by spring (7'). An adjustment arrangement including nut (6') and shaft (3') is used to set the spring bias.

7 Claims, 2 Drawing Sheets

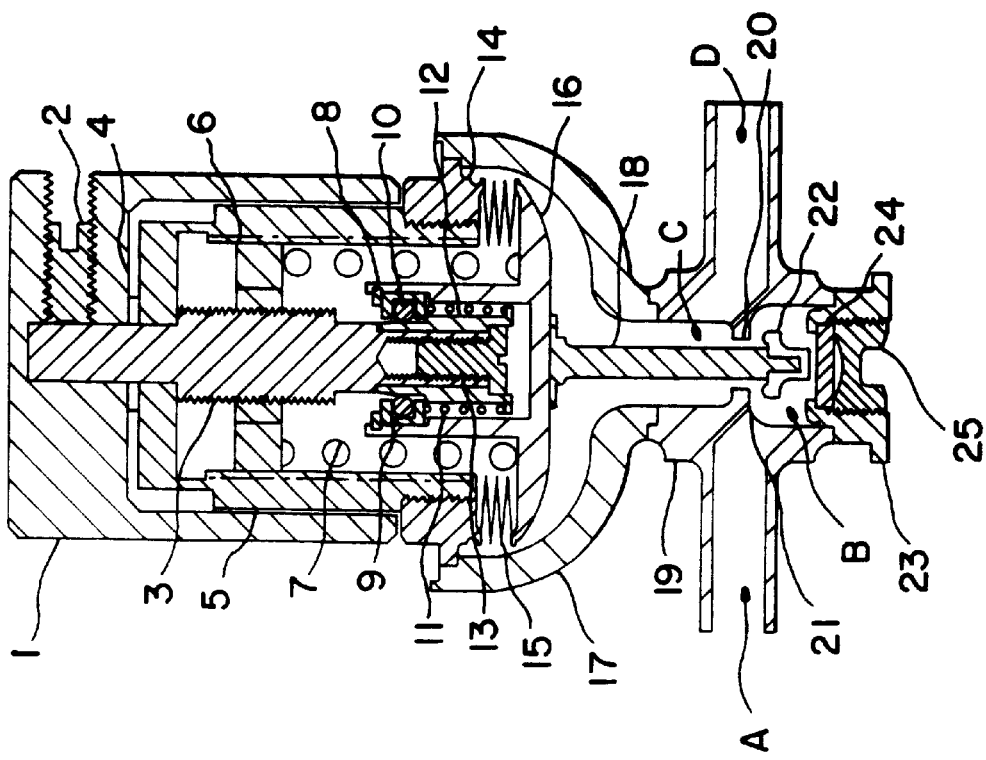

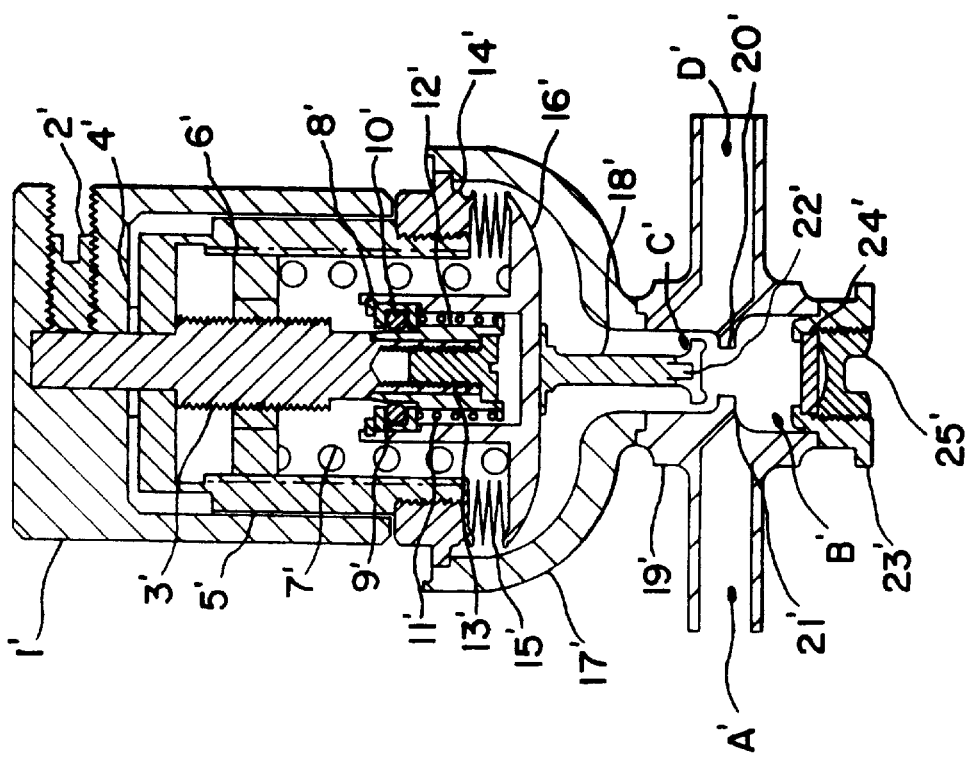

SPRING LOADED BELLOWS REGULATOR

BACKGROUND OF THE INVENTION

This application relates to pressurized fluid systems and more particularly to an apparatus for regulating the pressure in the system. The invention will be described with particular reference to a pressure regulator containing a spring loaded bellows assembly but it will be appreciated that selected aspects of the invention may have application in related fluid environments and uses.

U.S. Pat. No. 5,303,734 discloses a predecessor regulator, the disclosure of that patent being hereby incorporated by reference.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG. 1 is a longitudinal cross-sectional view of the new pressure regulator formed in accordance with the subject invention; and FIG. 2 is a longitudinal cross-sectional view of a modified regulator used as a back pressure regulator.

DETAILED DESCRIPTION OF THE PREFERRED EMBODIMENT

Referring now to FIG. 1, there is shown a preferred embodiment of the invention in which high pressure fluid enters inlet port A of body 19 and then continues on to the poppet chamber B. The fluid's passage from chamber B to chamber C through the orifice 20 is controlled by the opening between the movable poppet 22 and the orifice seat 21. After the fluid enters chamber C, it exits the body 19 via the outlet port D. The fluid pressure in chamber C acts against the movable bellows face plate 16, which is connected to the poppet stem 18, which extends through the orifice 20, The poppet stem is, in turn, connected to the poppet 22. The bellows face plate 16 is welded to a flexible bellows 15, which is welded to a bellows support collar 14. The bellows support collar is welded to an upper housing 17, which is welded to a main body 19.

One prefeaed form of bellows 15 includes a series of annular members or diaphragms that are alternately secured at radially inner and outer regions to define an accordion-like arrangement. Such a bellows arrangement has a relatively small stack height in a fully collapsed condition.

The pressure acting on the bellows face plate 16 is counteracted by a regulator spring 7 which pushes on the opposite side of the face plate. When the pressure in chamber C overcomes the force exerted by the regulator spring, the face plate yields to the greater force and moves upward, moving the poppet stem and poppet until the poppet seals against the poppet seat. Once the poppet engages the seat, further flow is stopped and a corresponding increase in pressure occurs. As flow exits chamber C through the outlet port D, the pressure in chamber c is reduced and the regulator spring force then exceeds the fluid force on the face plate. This causes the face plate, the poppet stem, and the poppet to move downward thereby opening the orifice passage and allowing flow to resume.

The pressure setting can be varied by adjusting the amount of regulator spring force. This is accomplished by turning adjusting knob 1 which is attached by set screw 2 to adjusting shaft 3. Threaded onto the adjusting shaft 3 is a spring compression nut 6 which is prevented from turning because its hex points slide in grooves machined into spring housing 5. Hence as the adjusting shaft rotates, the spring compression nut axially advances or retracts applying increased or decreased spring force on the back side of the bellows face plate 16.

In addition to the above main concept, the regulator has a mechanism for preventing oscillations or vibrations. This is accomplished by an O-ring 10 housed in an O-ring catch 9 that fits tight over a damper shaft 12. This arrangement exerts a slight resistance to movement of the bellows face plate 16 as it responds to rapid pressure changes. The damper shaft 12 is provided with a taper so that just as the poppet is about to close, the O-ring's tight fit diminishes so as not to resist the sealing force necessary to stop all flow between the poppet 22 and the orifice seat 21.

Another feature of this regulator is return spring 11. This spring assures that when the adjusting knob is turned to fully retract the spring compression nut, and therefore, all regulator spring force, the bellows face plate will move upward and the poppet will be urged to move tightly against the orifice seat.

Welded to the bottom of the main body 19 is a body base 23 which has an access port to service the poppet 22. This port is sealed by a gasket 24 being pressed against a seat by a set screw 25.

In a second preferred embodiment shown in FIG. 2, the poppet 22' is located in chamber C for sealing on the upper or opposite face of orifice 20'. In this arrangement, the assembly can be used as a back pressure regulator in which the port D becomes the inlet and the port A is the outlet. The poppet stem 18' is of reduced length and the poppet 22' is inverted relative to the FIG. 1 configuration to seal on the upper seat. In this manner, the pressure in the inlet D acts on the bellows and regulator spring to provide a predetermined pressure at which the poppet is lifted from the seat. This controls the fluid flow (and pressure) to the outlet A as desired with a back pressure regulator. In substantially all other respects, this embodiment is structurally and functionally identical to the FIG. 1 embodiment.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A pressure regulator comprising:

a housing having an inlet and outlet communicating with a chamber and a seat interposed between the inlet and the outlet;

a pressure responsive member disposed in the chamber between the inlet and the outlet for controlling fluid flow from the inlet to the outlet and including a spring for urging the pressure responsive member open until the fluid pressure in the chamber reaches a selectable pressure setting, said spring isolated from the chamber, said pressure responsive member further including a flexible stacked diaphragm bellows, a movable bellows plate and a seal member operatively associated with the bellows plate for selectively engaging the seat in response to the pressure in the chamber, said bellows secured to the housing at a first end and secured to the bellows plate at a second end;

an adjustment member for selecting said pressure setting of the pressure responsive member, said adjustment member connected to the bellows plate through a damper having a tapered region that receives an elastomeric member to eliminate vibrations; and a return spring for urging the pressure responsive member toward the seat when the adjustment member is fully retracted, said return spring isolated from the chamber.

2. The pressure regulator of claim 1 wherein the adjustment member includes a shaft extending through the housing and threadably receiving a movable nut member thereon, the movable nut member having an external surface closely and non-rotatably received in the housing, and wherein the spring has a first end that engages the nut member and a second end that engages the bellows plate.

3. The pressure regulator of claim 2 wherein the adjustment member further includes a set screw and an adjusting knob, wherein the set screw connects the adjusting knob to the shaft.

4. The pressure regulator of claim 1 wherein the pressure responsive member includes a poppet extending therefrom for selective engagement with the seat.

5. The pressure regulator of claim 1 wherein the bellows comprises at least two flexible annular diaphragms alternately stacked and secured to one another at radially inner and outer regions.

6. The pressure regulator of claim 1 wherein the spring and the return spring are exposed to atmosphere.

7. The pressure regulator of claim 1 further comprising a bellows support collar, said collar interposed between the bellows and the housing such that said collar is secured on a first end to the first end of the bellows and secured on a second, opposite end to the housing.

\* \* \* \* \*